July 3, 1956  I. E. WIEGERS  2,753,146
VALVE WITH LEVER SYSTEM HAVING AN ADJUSTABLE FULCRUM
Filed Oct. 7, 1952
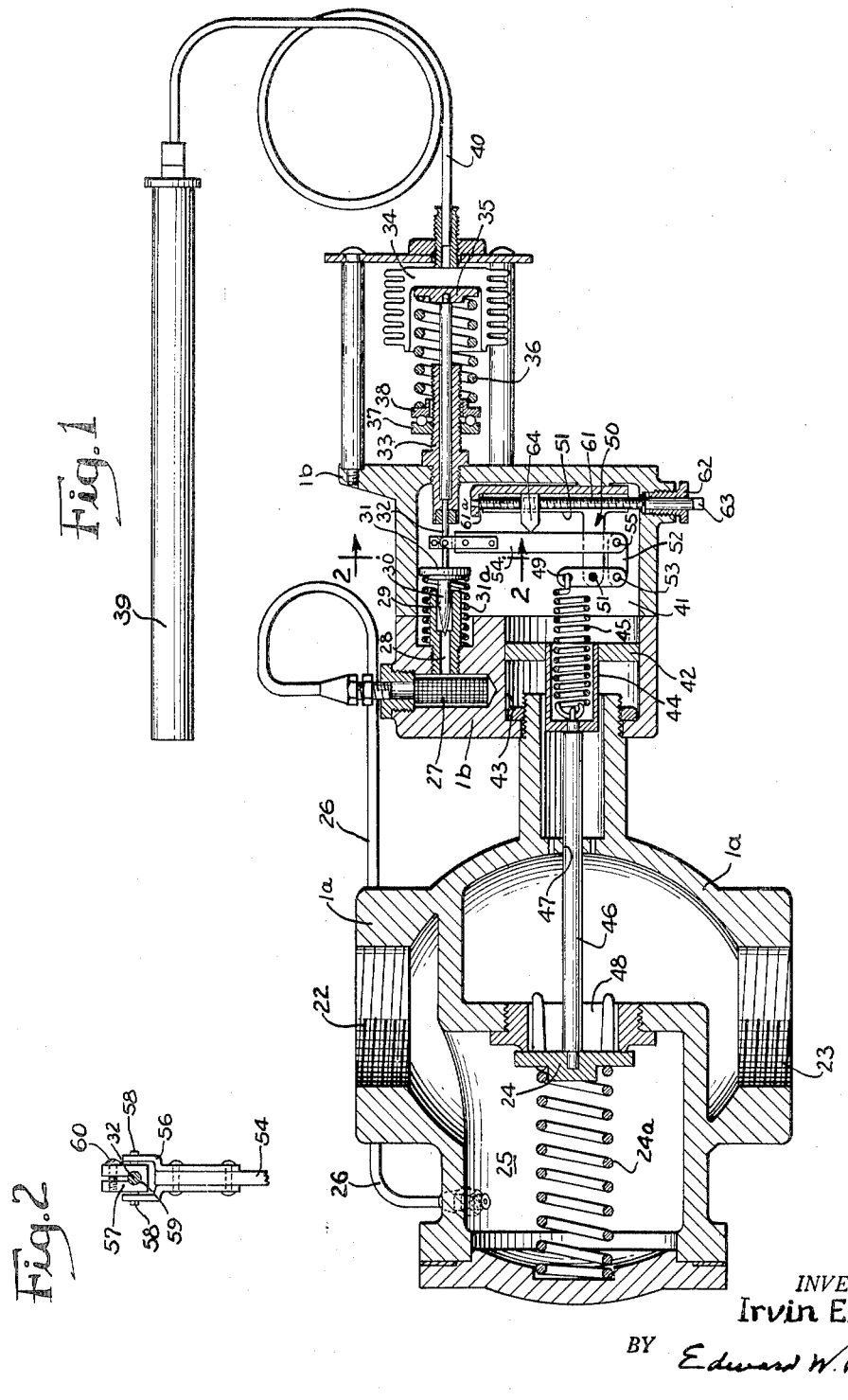
INVENTOR.
Irvin E. Wiegers
BY Edward W. Weinert
Atty.

United States Patent Office 2,753,146
Patented July 3, 1956

2,753,146

VALVE WITH LEVER SYSTEM HAVING AN ADJUSTABLE FULCRUM

Irvin E. Wiegers, Hamilton, Ohio, assignor to Hamilton Thomas Corporation, Hamilton, Ohio, a corporation of Ohio Application October 7, 1952, Serial No. 313,480

6 Claims. (Cl. 251—28)

This invention relates to a valve with lever system having an adjustable fulcrum for pressure operated valves of the throttling type in which the main valve is energized by the pressure of the fluid which it is controlling.

This application constitutes an improvement upon my prior Patent No. 2,304,323 to which reference may be had.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Fig. 1 is a longitudinal sectional view through a valve housing embodying this invention; and Fig. 2 is a detail sectional view taken upon the line 2—2 of Fig. 1.

In referring now to the drawing, there is shown a valve housing having a fluid inlet 22 and a fluid outlet 23 located in the section 1a. The fluid is adapted to enter the inlet port 22 and emerge at the outlet port 23 when the main valve 24 has been forced open as will later appear.

Fluid from the inlet chamber 25 will pass through pipe 26 to a screening well 27 located in the casing section 1b. The screening well communicates with a passage 28 in a plunger stem socket 29. A needle valve 30 operates in the passage 28 and is provided with a head 31 which abuts a forwardly extending stem 32 which passes through a long sleeve bearing 33 secured in the casing 1b. The stem 32 extends beyond the sleeve 33 and into a yieldable and flexible cup or bellows 34, the end of which is in abutting relation with a buffer plate 35 on the end of the stem 32. A coil spring 31a surrounds the plunger socket 29 and forces plate 31 against stem 32 and holds needle valve 30 open admitting steam or fluid at inlet pressure to chamber 41 under predetermined conditions.

A coil spring 36 which surrounds the sleeve 33 extends from the buffer plate 35 to an adjustable ball bearing 37—38; the race ring 37 being adjustably threaded upon the sleeve 33 while the race ring 38 is freely floatable. By adjusting the race ring 37, the pressure on the buffer head can be varied and made to balance the bellows force with needle valve 30 closed.

The pilot valve 30 is responsive to the force of the control pressure which may be supplied from various means, and as a matter of illustration, there is shown a bulb 39 charged with volatile fluid and connected to the casing 1b by hose 40 at the rear wall of the bellows 34. Such a bulb is usually placed in the fluid, the temperature of which it is desired to control with heating coils (not shown) connected with the outlet 23.

The pressure of spring 36 against buffer head 35 necessary to effect a balance with the bellows 34 may be said to constitute the control pressure. When the temperature or pressure of the bulb 39 falls below the control pressure, spring 36 will act against the buffer head 35 and compress the bellows 34 and simultaneously move stem or rod 32 in the same direction; at the same time, follow up spring 31a will move head 31 on the pilot valve 30 for opening the pilot valve 30. When the pilot valve is thuswise opened, steam or fluid is admitted at inlet pressure to chamber 41 for acting against piston 42. As the area of piston 42 is larger than the area of the outlet valve 24, the outlet valve will be opened. The positioning spring 45 urges the pilot valve 30 to a throttling position and the main valve port 48 will have an opening which is proportional to the temperature or pressure difference between the control pressure and the temperature or pressure of the bulb 39. This invention, however, is more directly concerned with means for varying the proportionality of the temperature differences as will now appear.

It will be noted that piston 42 travels in a cylindrical passage 43 formed in the section 1b of the housing. A thimble 44 is secured in the center of the piston 42 and this thimble houses a coil spring 45, the forward end of which is attached to a valve rod 46 extending through the end wall of the thimble. The valve rod 46 extends through the section 1a at 47 from whence it passes through outlet port 48 from inlet chamber 25. The main valve 24 is carried by the stem 46 and is adapted to open the main valve port 48 for discharging fluid through port 23 when the force of spring 24a, which tends to normally hold valve 24 closed, is overcome by the control pressure. When the control pressure causes the pilot valve to close, the main valve 24 will also close since there will be sufficient leakage around piston 42 for such a purpose.

The coil spring 45, which is attached to the piston 42 through the thimble 44, has its rear end connected to the top of a link 49 which is pivoted intermediate its length to a stationary fulcrum 50 as indicated at 51 which is in the form of an arm on a sleeve surrounding an adjusting screw. The lower end of the link 49 is pivoted to a horizontal link 52 as indicated at 53 and the link 52 is pivotally connected to actuating lever 54 as indicated at 55.

The lever 54 extends from the link 52 which is below the stationary fulcrum 50 to the pilot valve stem 32. The upper end of the lever 54 has a yoke or bifurcation 56 as shown in Fig. 2. A split block 57 is mounted in the bifurcation by means of trunnions 58 extending through the yoke members.

The split swivel block 57 has a groove therethrough into which the pilot valve stem 32 is adapted to be lodged and clamped therein by tightening the screw 60. Extending parallel with the actuating lever 54 and directly in the rear thereof is a screw rod 61 which is journalled at its upper end in a support 61a and at its lower end in a plug 62 secured in the outer frame member of the casing, the lower end of the rod 61 being of polygonal shape as at 63 so that it can be easily engaged by a tool or wrench for rotating the same from a point outside of the casing. The rod 61 is smooth at its journal points so that it will not travel. However, the rod 61 is threaded between the smooth journal parts and an adjustable fulcrum 64 is mounted upon the threaded portion. This travelling fulcrum which has a front knife edge is adapted to be engaged by the lever 54.

It will be obvious that the fulcrum 64 is independent in its action and can vary the action of the lever 54 by a mere sliding movement. No changes or modifications are needed to effect a wide range of adjustments, and all of these adjustments can be made from a point outside of the casing and at all times. It will also be obvious that the adjustment herein, which depends upon differentials of fluids, will produce a fluid discharge of very accurate pressures and will enable the user to match the main valve response very accurately to the requirements of the system on which it is installed.

I am aware that many changes may be made and various details of construction may be modified without departing from the principles of this invention so I do not propose limiting the patent granted otherwise than necessitated by the appended claims.

I claim:

1. In a mechanism of the class described, a valve housing having an inlet chamber, an outlet chamber and a control chamber, means providing a fluid passage from the inlet chamber to the control chamber, a pilot valve for controlling said passage, said pilot valve having a head in said control chamber, a yielding element acting against one side of said head for opening said pilot valve, yielding pressure responsive means acting against the other side of said head for controlling the movements of said pilot valve, a discharge valve between said inlet chamber and said outlet chamber and having a stem, fluid pressure responsive means in said control chamber connected to said stem, a lever having a pivotal connection with said yielding pressure responsive means and a pivotal connection with said fluid pressure responsive means, a free fulcrum engaging an intermediate portion of said lever and an adjustable rod having a threaded relation with said fulcrum and extending outside of said housing.

2. In a mechanism of the class described, a valve housing having an inlet chamber, an outlet chamber and a control chamber, means forming a screened passage from said inlet chamber to said control chamber, a pilot valve for controlling said passage, said pilot valve having a head in said control chamber, a coil spring acting against one side of said head for opening said pilot valve, yielding means acting against the other side of said head for controlling the movements of said pilot valve, external pressure means connected to said housing for controlling the action of said yielding means, a discharge valve between said inlet chamber and outlet chamber and having a stem, pressure responsive means in said control chamber connected to said stem, a lever in said control chamber having a pivotal connection with said yielding means and a yieldable connection with said pressure responsive means, a free fulcrum engaging said lever and an adjustable rod in threaded relation with said fulcrum and extending to a point outside of said housing.

3. In a mechanism of the class described, a valve housing having an inlet chamber, an outlet chamber and a control chamber, means forming a passage from said inlet chamber to said control chamber, a pilot valve for controlling said passage, said pilot valve having a head in said control chamber, a yieldable element acting against one side of said head for opening said pilot valve, yielding means acting against the other side of said head for controlling the movements of said pilot valve, external pressure means for controlling the action of said yielding means, a discharge valve between said inlet and outlet chambers, pressure responsive means in said control chamber connected to said discharge valve, a lever in said control chamber having a pivotal connection with said yielding means and a yieldable connection with said pressure responsive means, a free fulcrum engaging an intermediate portion of said lever and an adjustable rod in threaded relation with said fulcrum and extending outside of said housing.

4. In a valve housing having an inlet chamber, an outlet chamber and a control chamber, means forming a passage from said inlet chamber to said control chamber, a pilot valve for controlling said passage, said pilot valve having a head in said control chamber, a yieldable element acting against one side of said head for opening said pilot valve, yielding means acting against the other side of said head for controlling the movements of said pilot valve, external pressure means for controlling the action of said yielding means, a discharge valve between said inlet and outlet chambers, pressure responsive means in said control chamber having a connection with said discharge valve, a lever having a pivotal connection with said yielding means and a yielding linked connection with said pressure responsive means, a movable fulcrum engaging said lever and an adjusting rod in threaded relation with said fulcrum and extending beyond said housing.

5. In a mechanism of the class described, a valve housing having an inlet chamber, an outlet chamber and a control chamber, means forming a passage from the inlet chamber to said control chamber, a pilot valve for controlling said passage, said pilot valve having a head in said control chamber, a coil spring acting against one side of said head for opening said pilot valve, pressure controlled means acting against the other side of said head for controlling the movements of said pilot valve, a discharge valve between said inlet and outlet chambers, pressure responsive means in said control chamber for controlling said discharge valve, a lever connection between said pressure controlled means and said pressure responsive means, and an adjustable fulcrum for said lever and having means extending to a point outside of said housing.

6. In a mechanism of the class described, a valve housing having an inlet chamber, an outlet chamber and a control chamber, means defining a passage from said inlet chamber to said control chamber, a pilot valve for controlling said passage, said pilot valve having a head in said control chamber, a spring acting against one side of said head for opening said pilot valve, yielding means acting against the other side of said head for controlling the movements of said pilot valve, external pressure means for controlling the action of said yielding means, a discharge valve between said inlet and outlet chambers, pressure responsive means exposed to pressure in said control chamber and connected to said discharge valve and a lever connection between said yielding means and said discharge valve for the purpose set forth.

References Cited in the file of this patent

UNITED STATES PATENTS

| 393,020 | McLaren | Nov. 20, 1888 |
| 411,062 | Rossney | Sept. 17, 1889 |
| 660,872 | Taylor | Oct. 30, 1900 |
| 1,290,291 | Morrill | Jan. 7, 1919 |
| 2,076,306 | Weeks | Apr. 6, 1937 |
| 2,304,323 | Wiegers | Dec. 8, 1942 |

FOREIGN PATENTS

| 262,368 | Italy | Jan. 25, 1929 |